United States Patent
Ely et al.

(10) Patent No.: US 7,250,588 B2
(45) Date of Patent: Jul. 31, 2007

(54) COMBINATION BREAD TOASTER AND STEAMER DEVICE

(75) Inventors: David Ely, West Jordan, UT (US); Brian K. Beesley, Draper, UT (US); Alan Parkinson, Sandy, UT (US); Claude Brandt, Salt Lake City, UT (US)

(73) Assignee: Back To Basics Products, LLC, Vernon Hills, IL (US)

( * ) Notice: Subject to any disclaimer, the term of this patent is extended or adjusted under 35 U.S.C. 154(b) by 0 days.

(21) Appl. No.: 11/155,007

(22) Filed: Jun. 15, 2005

(65) Prior Publication Data
US 2006/0191891 A1 Aug. 31, 2006

Related U.S. Application Data

(60) Provisional application No. 60/654,699, filed on Feb. 17, 2005.

(51) Int. Cl.
*A47J 27/04* (2006.01)
*A47J 27/12* (2006.01)
*A47J 37/08* (2006.01)

(52) U.S. Cl. .............. 219/386; 219/392; 219/401; 219/412; 219/414; 219/428; 99/327; 99/339; 99/357

(58) Field of Classification Search ............... None
See application file for complete search history.

(56) References Cited

U.S. PATENT DOCUMENTS

| | | | |
|---|---|---|---|
| 2,334,122 A | 11/1943 | Payne | |
| 2,345,769 A | 4/1944 | Osrow | |
| 2,419,674 A | 4/1947 | Caplan | |
| 2,429,736 A | 10/1947 | Wales | |
| 3,396,655 A | 8/1968 | Yoshida et al. | |
| 4,119,020 A | 10/1978 | Sharp et al. | |
| D323,094 S | 1/1992 | Russell et al. | |
| 5,203,252 A * | 4/1993 | Hsieh | 99/339 |
| D340,831 S | 11/1993 | Manabe | |
| 5,522,306 A | 6/1996 | DeMars | |
| 5,673,608 A | 10/1997 | DeMars | |
| 5,694,831 A | 12/1997 | Haroun et al. | |
| 5,938,959 A * | 8/1999 | Wang | 219/401 |
| 6,016,741 A | 1/2000 | Tsai et al. | |
| 6,058,829 A | 5/2000 | Endres | |
| 6,532,864 B2 | 3/2003 | Ancona et al. | |
| 6,539,840 B2 | 4/2003 | Choi et al. | |
| 6,707,009 B1 | 3/2004 | Ancona et al. | |
| 6,772,678 B2 | 8/2004 | Choi et al. | |
| 6,831,254 B2 | 12/2004 | Barritt | |
| 7,005,616 B2 * | 2/2006 | Kim et al. | 219/451.1 |
| 2002/0060219 A1 | 5/2002 | Rypan | |
| 2005/0236386 A1 | 10/2005 | Fisher | |

(Continued)

FOREIGN PATENT DOCUMENTS

| | | |
|---|---|---|
| CN | 01343156.0 | 4/2002 |
| DE | 2818593 | 10/1979 |
| DE | 29718161 U | 2/1998 |
| HK | 0010171.3 | 2/2000 |
| JP | 55151287 | 11/1980 |

OTHER PUBLICATIONS

Global Sources, Breakfast Machine AV2008 Patented Breakfast Machine of 3-in-1 design; Toaster, Egg Boiler, Coffee Maker in High-Grade Design.
Alibaba.com, Guangzhou Well Electronic Factory, Sell Breakfast Maker 3-in-1.
Qschina.com, 3 In 1 Breakfast Machine with 6L Oven and .8L Coffee maker and 4-egg boiler, Foshan Weihe Yingfeng Electrical Appl Co., LTD.
Global sources, Congbao Electronic Manufacture Co. Ltd Automatic Breakfast Maker with Slide-out Crumb Tray, Easy to Clean.
Gizmodo The Gadgets Weblog, Three-in-One Breakfast Toaster Coffee Machine Egg Boiler.
Made-in-China.com, 3-in-1 Breakfast Maker.

* cited by examiner

*Primary Examiner*—Joseph Pelham
(74) *Attorney, Agent, or Firm*—Thorpe North & Western (57) ABSTRACT

A combination bread toaster and steamer device includes a pair of vertically oriented bread slots extending into a housing from a top of the housing; means for elevating and lowering bread in the bread slots; a steamer compartment, disposed on the housing, including a heater pan configured to receive water; and at least one heating element associated with the bread slots and the steamer compartment.

31 Claims, 9 Drawing Sheets

COMBINATION BREAD TOASTER AND STEAMER DEVICE

PRIORITY CLAIM

Priority of U.S. Provisional Patent Application Ser. No. 60/654,699 filed on Feb. 17, 2005 is claimed, and which is herein incorporated by reference.

RELATED APPLICATION

U.S. patent application Ser. No. 11/154,282, filed Jun. 15, 2005, entitled "Method for Simultaneously Toasting Bread and Steaming," which is herein incorporated by reference.

BACKGROUND

1. Field of the Invention

The present invention relates generally to a device, such as a breakfast sandwich maker, for simultaneously toasting bread and steaming or cooking another food, such as an egg and/or meat, for making a breakfast sandwich.

2. Related Art

Multi-function breakfast machines have been proposed for making several breakfast items, such as toast, eggs and coffee. Such machines include a horizontally oriented toaster oven, an egg broiler, and a coffee maker or warmer. For example, see U.S. Pat. No. 5,203,252 or U.S. Des. Pat. 340,831. Some machines may have an egg receiving area or a coffee receiving area disposed over a toaster oven. Some machines may have a coffee maker disposed adjacent a toaster oven and an egg receiving area disposed over the coffee maker. In addition, some of these devices appear to utilize the heat from one device, such as the toaster oven, to cook an egg in the egg broiler or warm coffee. Other machines have been proposed that combine a vertical toaster with a horizontal toaster oven. For example, see U.S. Pat. No. 5,694,831. It will be appreciated that different foods require different heating temperatures and different heating or cooking times. Therefore, many of these devices appear to utilize a plurality of separate controls, for example, separate controls for the toaster oven, egg broiler and coffee maker.

SUMMARY OF THE INVENTION

It has been recognized that it would be advantageous to develop a device or method for simultaneously toasting a bread and warming or cooking another food, such as cooking an egg and/or heating a meat. In addition, it has been recognized that it would be advantageous to develop a device or method for automatically toasting a bread and warming or cooking another food, even though the cooking time for both is different. In addition, it has been recognized that it would be advantageous to develop a device or method for combining bread toasting functions and food steaming functions into a single device or method to save time, reduce the number of appliances, and efficiently utilize kitchen or counter space.

The invention provides a combination bread toaster and steamer device with: a housing; a pair of vertically oriented bread slots extending into the housing from a top of the housing; means for elevating and lowering bread in the bread slots; a steamer compartment, disposed on the housing, including a heater pan configured to receive water; and at least one heating element associated with the bread slots and the steamer compartment.

In accordance with another more detailed aspect of the present invention, the device can include a common controller, shared by both the bread heating element and the steamer heating element, for activating both the bread heating element and the steamer heating element.

In accordance with another more detailed aspect of the present invention, the device can include means for automatically activating the bread heating element subsequent to activation of the steamer heating element.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIGS. 5b and c are top and bottom views, respectively, of the steamer cup of FIG. 5a;

FIG. 6 is a perspective view of a meat tray of the device of FIG. 1;

FIG. 13a is a perspective view of another combination bread toaster and steamer device or hot dog maker in accordance with another embodiment of the present invention;

FIG. 13b is a side view of the device of FIG. 13a;

FIG. 13c is a cross-sectional side view of the device of FIG. 13a; and

FIG. 13d is a top view of the device of FIG. 13a.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1-12, a combination bread toaster and steamer device, indicated generally at 10, is shown in accordance with an exemplary embodiment of the present invention. Specifically, the device 10 is configured as a breakfast sandwich maker, or to simultaneously toast bread or English muffins and cook one or more eggs. The term "bread" is used broadly herein to include any type of bread, including for example, sliced bread, English muffins, bagels, rolls, buns, etc.

The device 10 includes both a bread toaster or a bread toasting mechanism 14 and a steamer or a steamer compartment 18 integrated into a single appliance. Thus, the device can perform toasting and steaming functions. Such a single appliance can efficiently utilize space, increase available kitchen or counter space, and/or reduce the number of appliances or dishes that would typically be utilized. In addition, the function or operation of both the bread toaster 14 and steamer 18 is coordinated to efficiently and automatically toast bread and cook or heat another food, such as an egg, as discussed in greater detail below. It will be appreciated that the cooking times for bread and another food, such as an egg, differ. Thus, the device can be configured to automatically delay toasting of the bread until after the steaming or egg cooking function has begun. Alternatively, the device can be configured to begin toasting of the bread and steaming or egg cooking at the same time, but can also maintain the bread or toast within the device until the steaming or egg cooking function terminates, in order to maintain the temperature of the bread or toast.

The device 10 includes a housing 22 to support both the toaster 14 and the steamer 18. The housing 22 and/or toaster 14 can include a pair of bread slots 26. The bread slots 26 can be vertically oriented and can extend into the housing from a top of the housing, as opposed to the horizontal orientation and side access of a toaster oven. In addition, the bread slots 26 can be spaced-apart from one another and oriented in a parallel relationship, as shown.

The device 10 or toaster 14 can also include a lift mechanism 30 for raising and lowering bread out of and into the slots, as is known in the art. The lift mechanism can include a slide arm or lever 34 that is coupled to the lift mechanism 30 inside the housing, but extends through a slot in the housing to an engagement end that can be grasped or contacted by a user to manually raise and lower lift mechanism. The lift mechanism 30 can be spring biased to a raised position, and can include an automatic release mechanism that holds the lift mechanism in a down position and which depends on time or heat to release the mechanism, as is known in the art. The lift mechanism is one example of means for elevating and lowering bread in the bread slots.

The steamer (or egg) compartment 18 is also disposed on or associated with the housing 22. The steamer 18 can be positioned at an end of the housing, and at an end of the pair of slots 26. The steamer 18 includes a heater pan 38 to receive water. Thus, the heater pan 38 can be bowl shaped or concave.

One or more heating elements are disposed in the housing 22 and associated with the toaster 14 and steamer 18, or the bread slots 26 and heater pan 38. The heating elements can be electrical resistance type heating elements, as is known in the art. One or more bread heating elements 42 can be disposed adjacent the bread slots 26. For example, the heating elements 42 can be disposed on both sides of both bread slots. A steamer or egg heating element 46 disposed adjacent the steamer compartment 18, or adjacent and below the heater pan 38. Heat from the bread heating elements 42 toasts the bread, while heat from the steamer heating element 46 heats, boils or steams water in the heater pan 38.

In addition, the housing 22 can include a control panel with one or more controls, buttons or inputs to operate the device 10. The inputs can be electrically or operatively coupled to control electronics or a controller which are electrically or operatively coupled to the heating elements 42 and 46. The control electronics or controller can be of any appropriate type and design, and can include a timer, to activate and deactivate the heating elements. For example, the controller can include a PCB and/or an IC circuit. The control panel 50 can include a single input 54 for selecting and controlling both the toasting and steaming function. In addition, the slider arm or lever 34, or the lift mechanism 30, can be operatively coupled to the controller. Thus, by engaging the single input 54 for both toasting and steaming, and depressing the slider arm or lever 34, both the toaster 14 and steamer 18 can be activated and controlled. Therefore, the bread heating element and the steamer heating element share a common controller for activating both the bread heating element and the steamer heating element. The controller can be the control electronics or an input.

As indicated above, the controller can be configured to activate the steamer heating element 46 first, and then subsequently and automatically activating the bread heating element 42. Thus, the steaming and toasting functions can terminate or complete at substantially the same time so that both the bread and the other food are both hot. It will be appreciated that bread can toast relatively quickly. Thus, beginning the toasting and steaming functions at the same time can result in the bread toasting first and cooling before the steaming function is complete. Thus, the device provides a single input 54 and a controller operatively coupled to the bread heating element 42 and the steamer heating element 48 to initially activate the steamer heating element, and automatically and subsequently activate the bread heating element. The controller or IC circuit is an example of means for automatically activating the bread heating element subsequent to activation of the steamer heating element; or means for delaying operation of the bread heating element with respect to the steamer heating element.

Additional inputs can also be provided to separately control the device, or the toaster and steamer. For example, the control panel can include a selection control with a plurality of inputs operatively coupled to the bread and the steamer heating elements. The selection control or inputs can be selectable between at least three operating conditions, including: operation of only the bread heating element with a bread only input 58*a*; operation of only the steamer heating element with a steamer only input 58*b*; and operation of both the bread heating element and the steamer heating element with the single input 54. In addition, the selection control can include a cancel input 62 that terminates activation of the heating element. The selection control can include membrane pads that can include indicia indicating the function of the input. In addition, the membrane pads can be back-lit so that the inputs or indicia light when the associated heating element is activated. The toaster function or operation of only the bread heating element can be accomplished by simply depressing the slider arm or lever 34, without the need for the bread only input 58*a*. In addition, the bread only input 58*a* can indicate when selected, such as by flashing, that the slider arm or lever 34 should be depressed to proceed with toasting.

Furthermore, a toasting level input 110 can be provided to select the desired toasting level, or lightness to darkness, of the desired bread or toast. The bread heating element and the steamer heating element can be activated at the same time, but the bread heating element can deactivate prior to the steamer heating element. In such a case, the lift mechanism can be delayed to maintain the bread in the slot, and thus maintain the temperature of the bread, until the steamer heating element terminates.

Alternatively, the toasting level input 110 can be operatively coupled to the controller to adjust the delay of the operation of the bread heating element. For example, if set on the darkest setting, the bread heating element can be activated approximately 45 seconds after activation of the steamer heating element. As another example, if set on a lighter setting, the bread heating element can be activated later, such as after approximately 2 minutes.

As stated above, the device 10 can be configured as a breakfast sandwich machine, or to both toast bread and cook an egg. Thus, the controller can be similarly configured. For example, the controller configured to activate the steamer heating element for approximately four minutes, and configured to activate the bread heating element at least approximately 45 seconds after activation of the steamer heating element. In addition, the indicia for the inputs can be identified as "toast," "egg," "egg and toast," and "cancel."

A thermostat 64 or other sensor can be operatively coupled to the heater pan 38 and the steamer heating element 46, such as by the control electronics or controller, to sense the temperature of the heater pan. It will be appreciated that the temperature of the heater pan 38 will rise if no water is in the heater pan. The controller can be configured to inactivate the steamer heating element 46 at a predetermined temperature to avoid heat damage to other components.

The steamer compartment 18 can include a food cup or an egg cup 66 to receive a another food to be cooked or warmed, such as an egg, or the egg white and egg yoke of the opened egg. Alternatively, just the egg white of the opened egg can be used for healthier meals. The egg cup can be formed of a material with good heat transfer characteristics, such as aluminum. The egg cup 66 can include a handle 70 that can be formed of the same material as the egg cup, and that can extend out of the steamer compartment 18. Alternatively, the handle 70 formed of a material with insulative properties, such as plastic, and can remain within the steamer compartment 18. The steamer compartment 18 can include or can form an enclosure into which the egg cup 66 is placed so that steam, and the heat therefrom, surrounds the egg cup to cook the egg.

Figure 1:
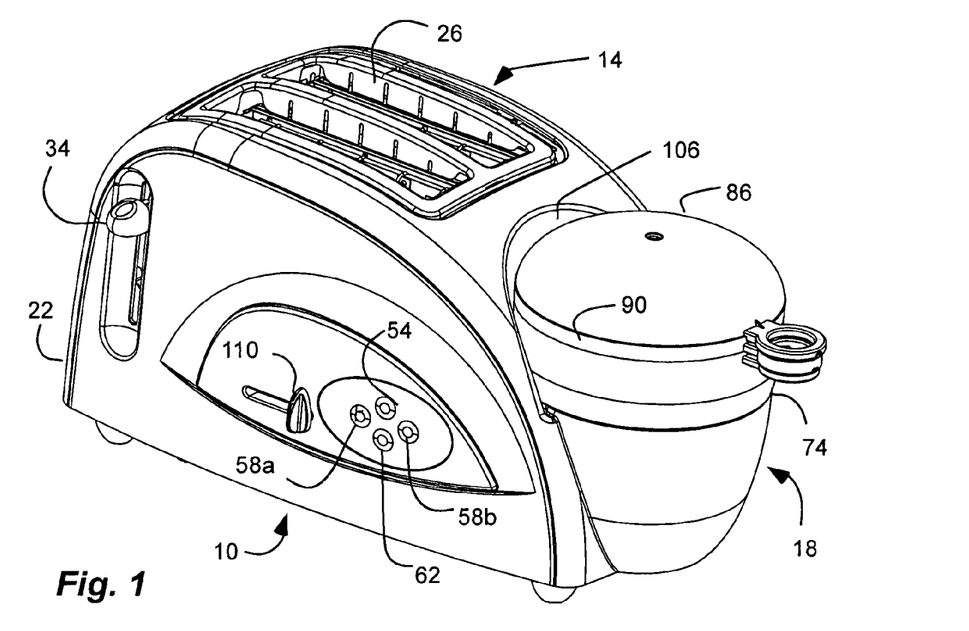
FIG. 1 is a perspective view of a combination bread toaster and steamer device or breakfast sandwich maker in accordance with an embodiment of the present invention.
Figure 2A:
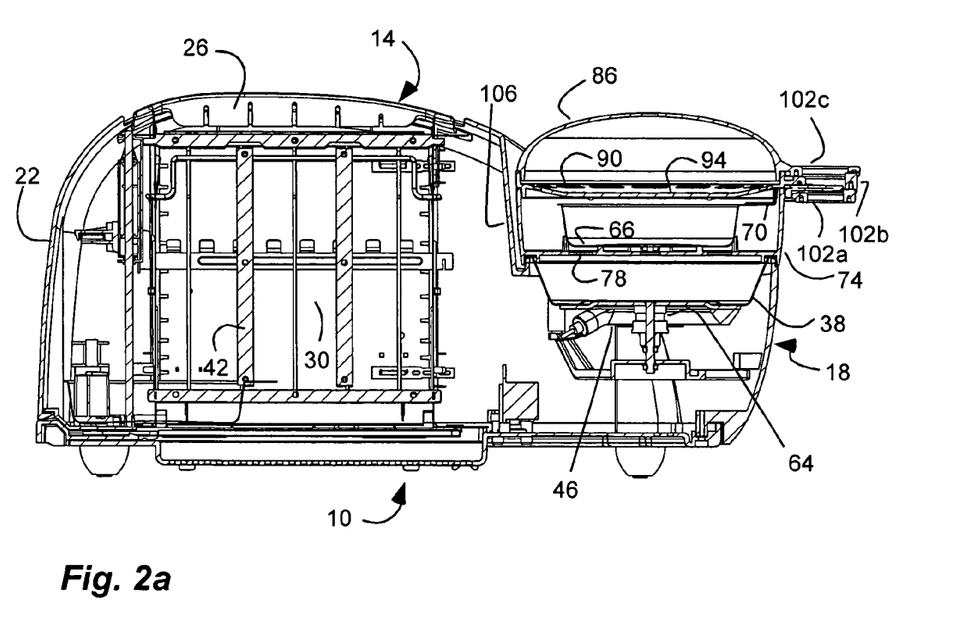
FIG. 2a is a side cross-sectional view of the device of FIG. 1.
Figure 2B:
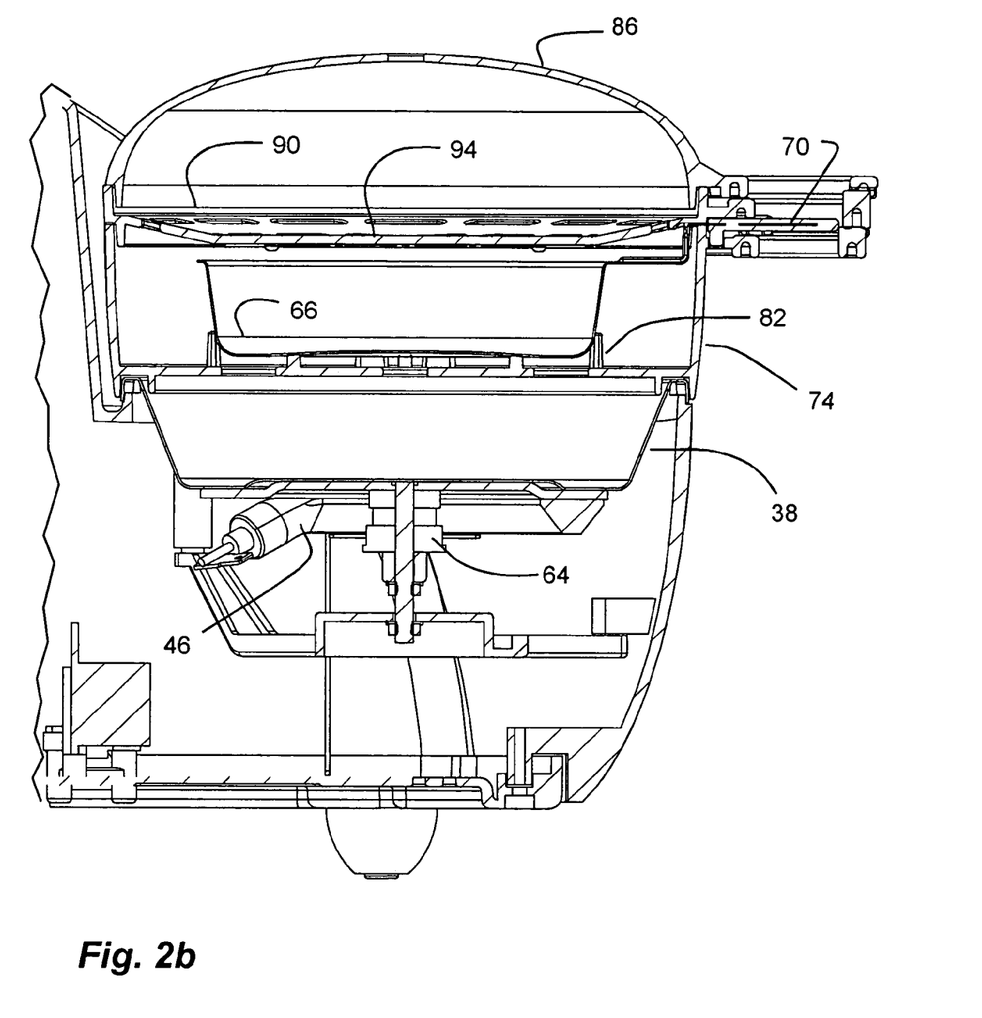
FIG. 2b is a partial side cross-sectional view of the device of FIG. 1.
Figure 3A:
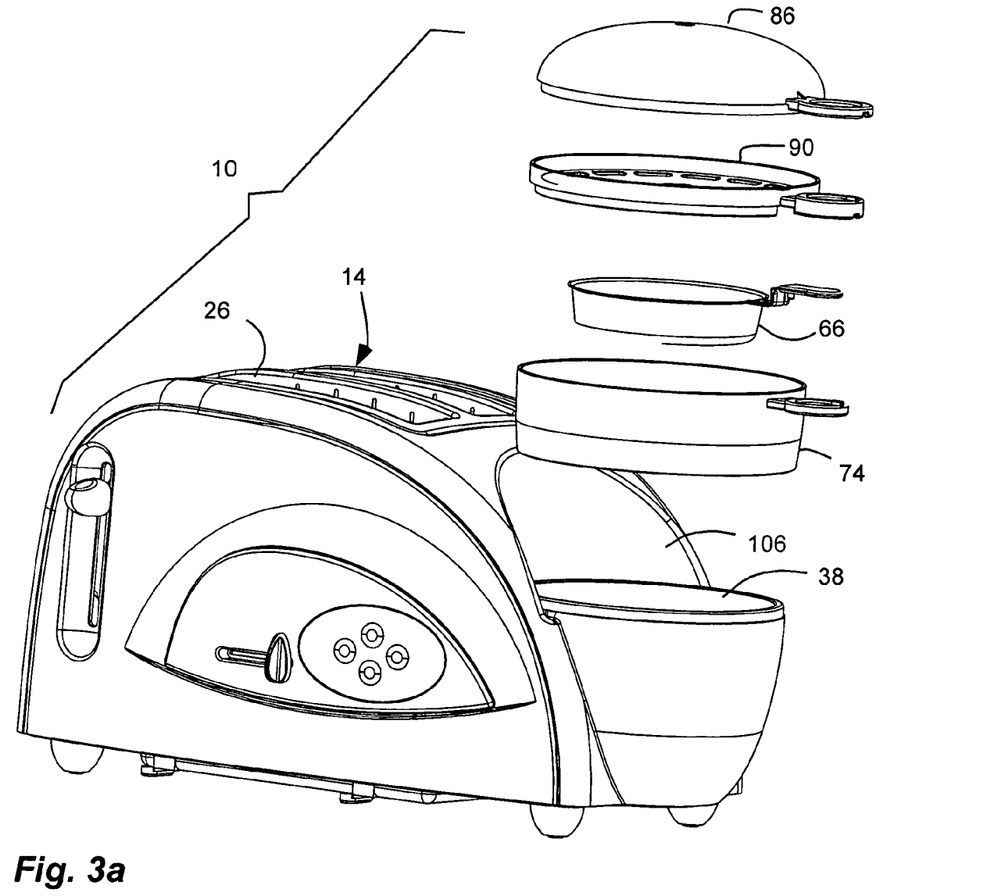
FIG. 3a is a partially exploded perspective view of the device of FIG. 1.
Figure 3B:
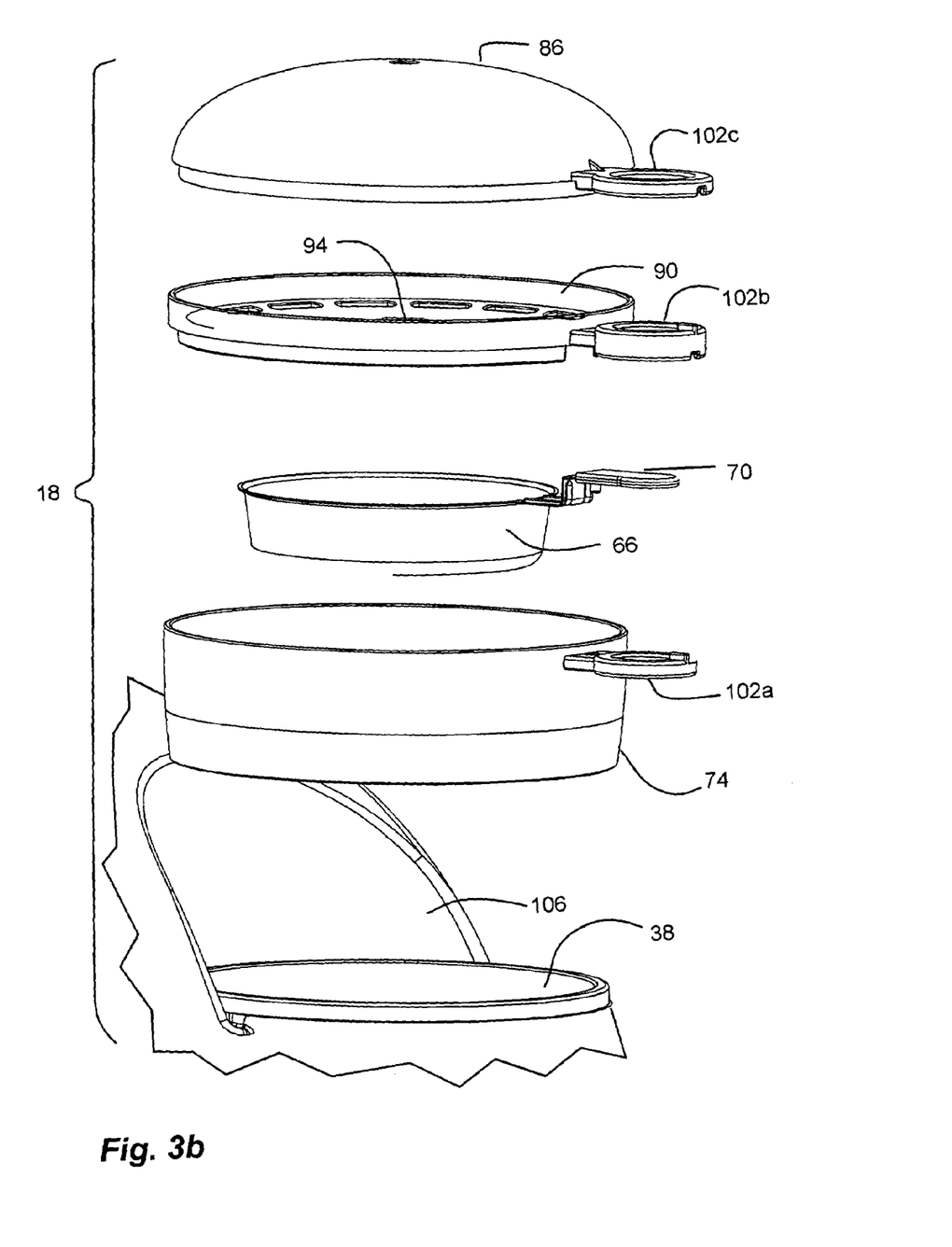
FIG. 3b is a detailed exploded perspective view of a portion of the device of FIG. 1.
Figure 4:
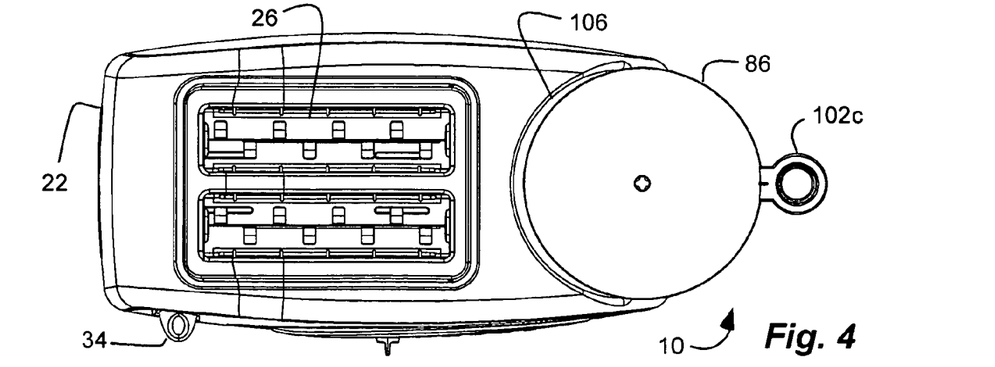
FIG. 4 is a top view of the device of FIG. 1.
Figure 5A:
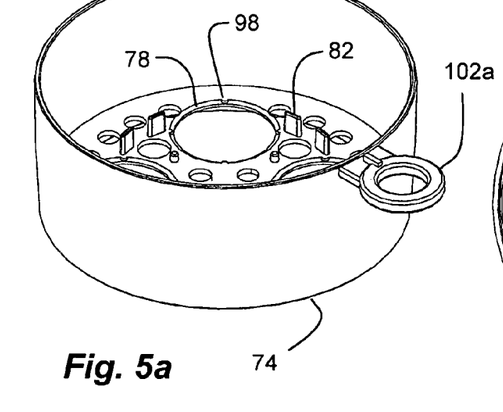
FIG. 5a is a perspective view of a steamer cup of the device of FIG. 1.
Figure 5B:
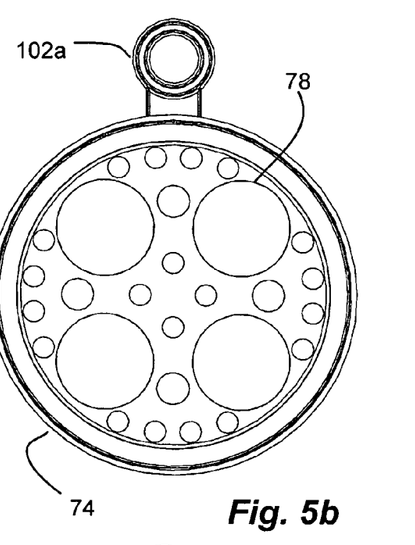
Figures 5C, 6:
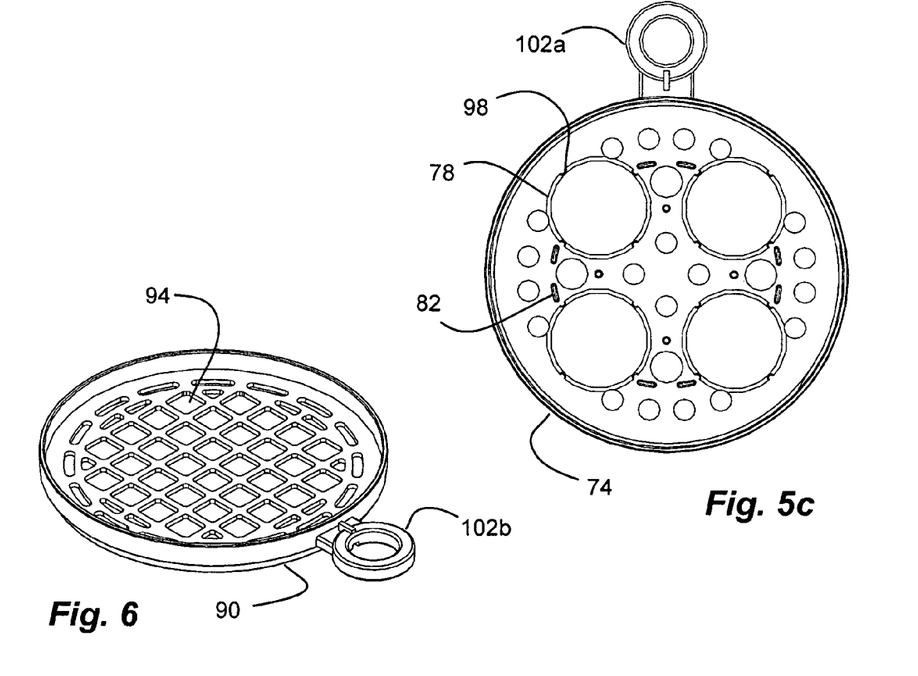
Figure 7:
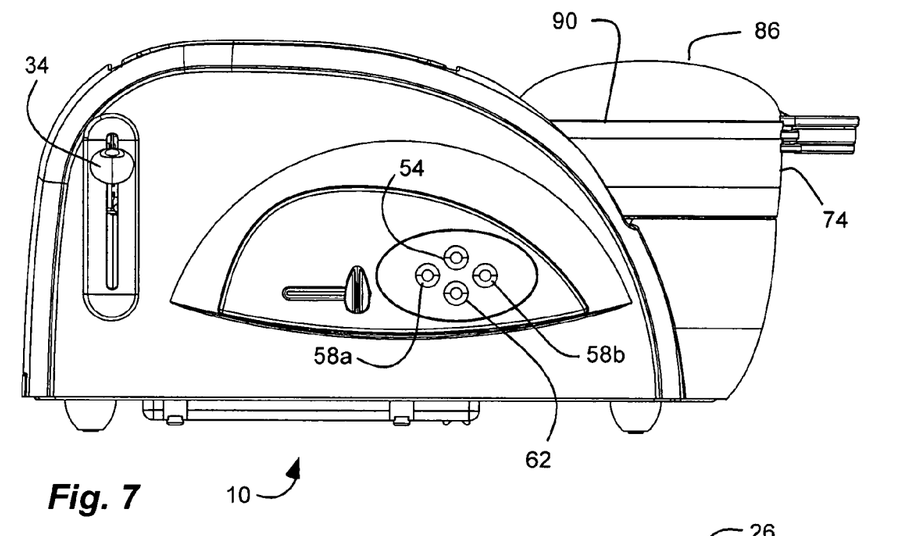
FIG. 7 is a front side view of the device of FIG. 1.
Figure 8:
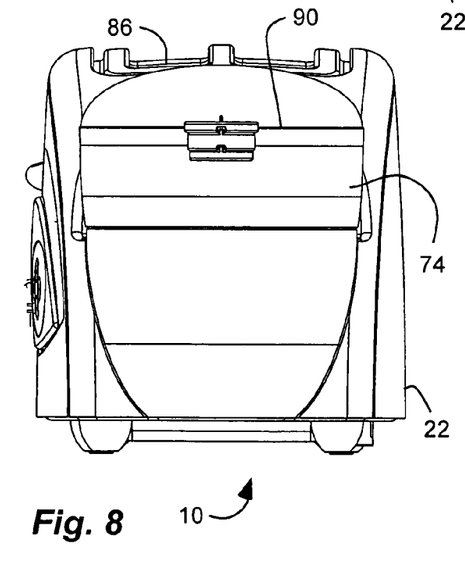
FIGS. 8 and 9 are end views of the device of FIG. 1.
Figure 9:
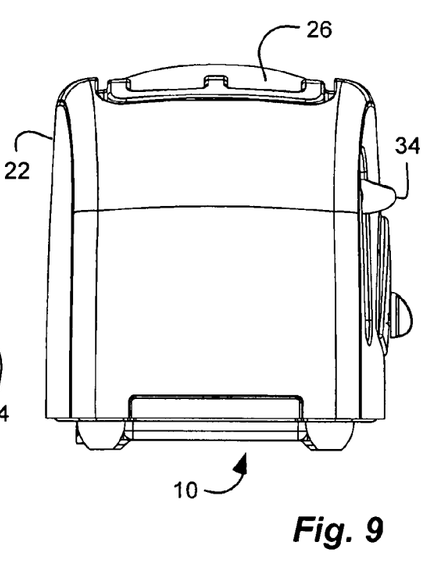
Figure 10:
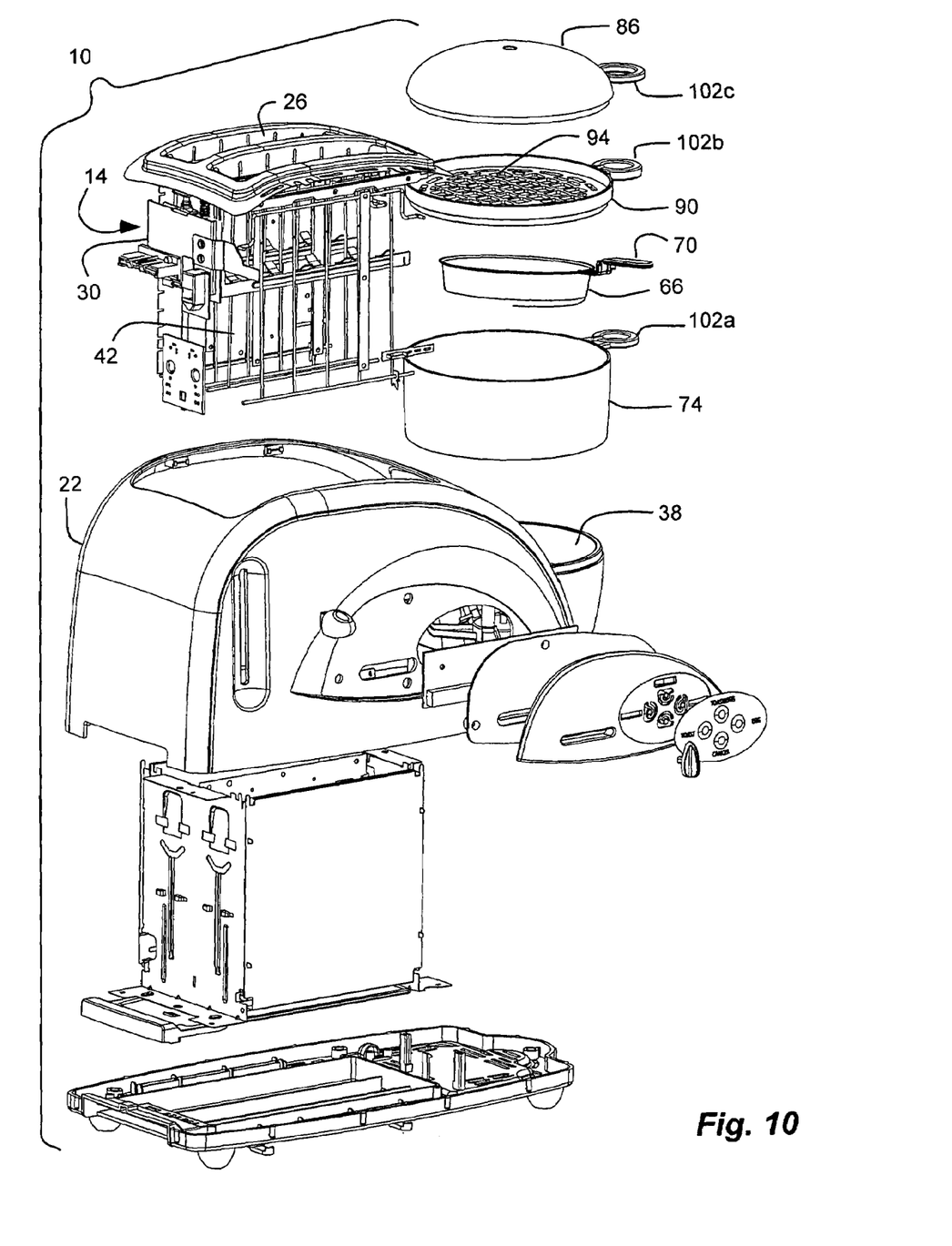
FIG. 10 is an exploded view of the device of FIG. 1.
Figure 11:
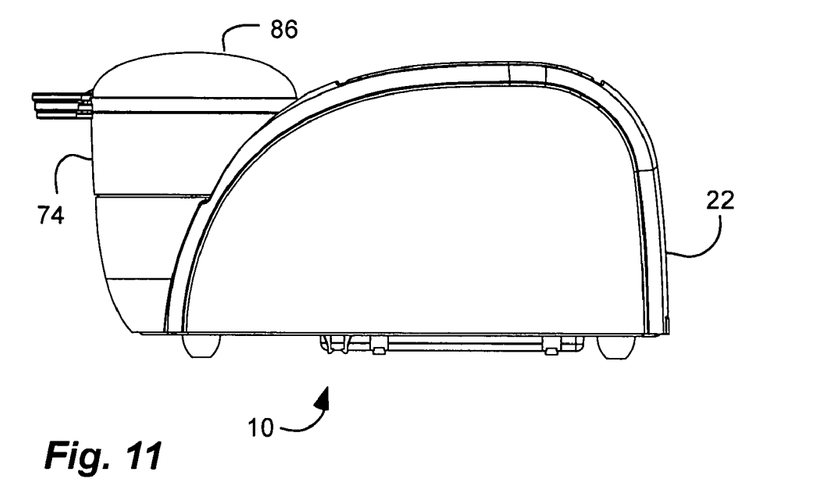
FIG. 11 is a back side view of the device of FIG. 1.
Figure 12:
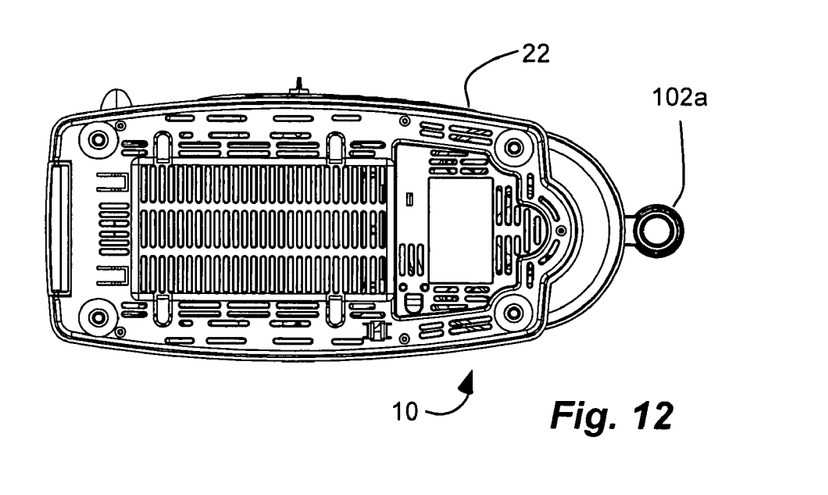
FIG. 12 is a bottom view of the device of FIG. 1.
Figures 13A, 13B, 13C, 13D:
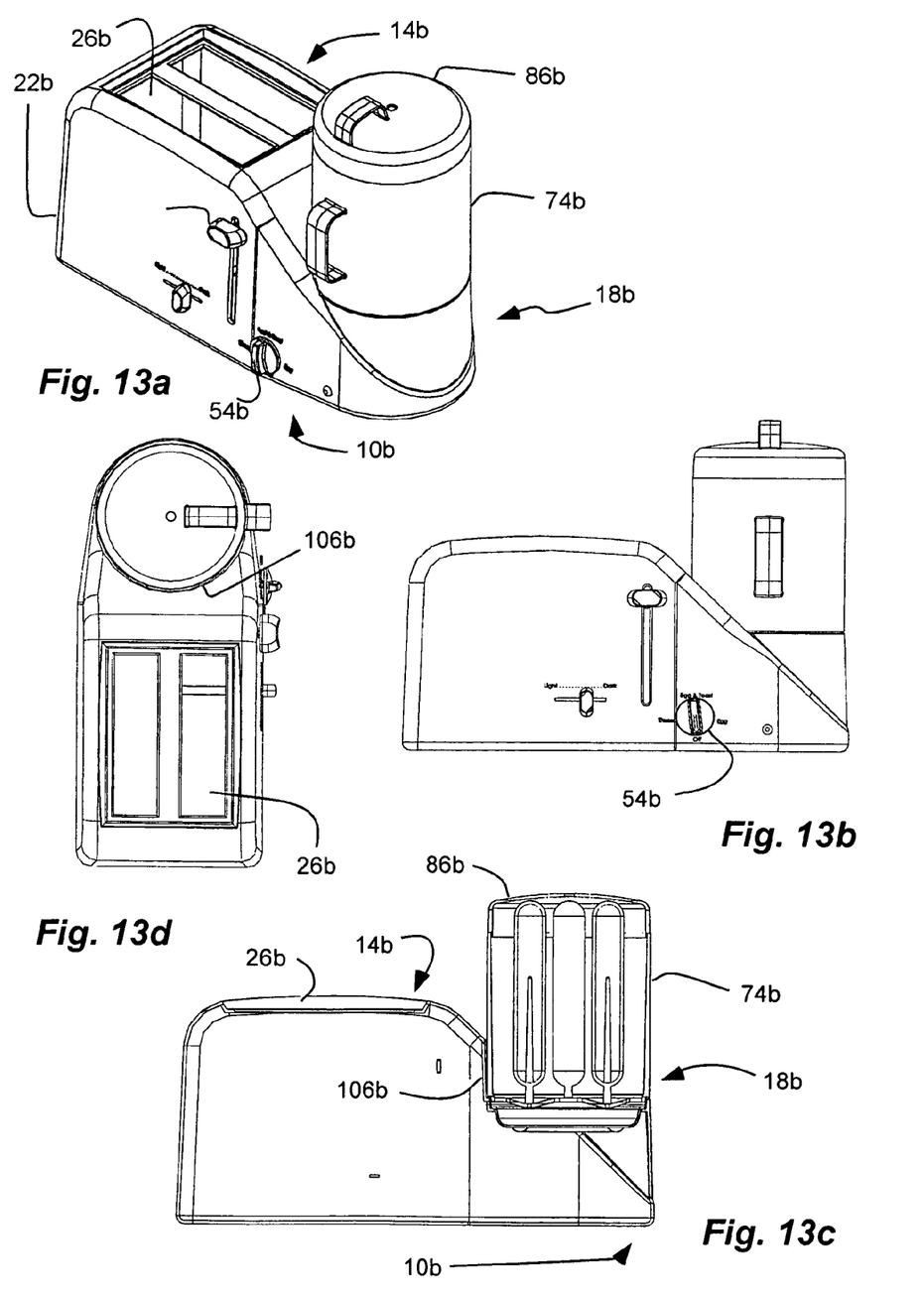

The steamer compartment 18 can further include, and the enclosure can be formed by, a steamer cup 74 disposed over the heater pan 38 and around the egg cup 66. A plurality of holes 78 can be formed in the bottom of the steamer cup 74 to allow steam and heat to enter the steamer cup. The steamer cup 74 can be removably disposed on the steamer 18 or housing 22 so that it can be removed for cleaning, and can be used to remove the egg or egg cup 66 after cooking without having to grasp the hot egg or hot egg cup. The steamer cup 74 and housing 22 or heater pan 38 can mate or nest to retain the steamer cup. For example, an annular lip or ridge can protrude from the housing 22 or heater pan 38 into an annular groove on the steamer cup. Futhermore, one or more protrusions 82 can extend upwardly from a bottom of the steamer cup 74 to receive the egg cup 66 and to align or center the egg cup 66 in the steamer cup 74, and to elevate the egg cup 66 above the bottom of the steamer cup 74 to allow steam to circulate around the egg cup. A lid 86 can be removably disposed over the steamer cup 74, and thus the egg cup 66, to further form the enclosure. A hole can be provided in the lid to allow steam to escape, and resist build-up of pressure from the steam.

In addition, a meat tray 90 can be disposable over the steamer compartment to warm a mean, such as bacon, sausage, Canadian bacon, etc. The meat tray 90 can include a plurality of apertures or a grill 94 to allow steam to circulate around the meat. The tray can be shaped, and the apertures positioned, to allow drippings from the meat to fall into the egg cup and flavor the egg, and/or without dripping into the heater pan. An annular lip or ridge can protrude from a bottom of the tray 90 into the steamer cup 74 to maintain the tray in position. Thus, a top edge of the steamer cup can abut to a flange of the tray. Similarly, the lid 86 can have an annular lip or ridge protruding into the tray to maintain the lid on the tray. Thus, the steamer cup 74, egg cup 66, tray 90 and/or lid 86 can be stacked in a stable manner. It will be appreciated that the steamer 18 can be utilized without the tray 90, and with the lid 86 disposed directly on the steamer cup 74. In addition, it will be appreciated that the steamer 18 can be utilized without the egg cup 66. The steamer cup 74, and holes therein 78, can be configured to receive one or more whole eggs. Thus, the steamer cup 74 can have a height or depth sized to accommodate a whole egg. The holes 78 in the steamer cup 74 can have a beveled or angled edge to more closely match the angled or curved side of the egg. In addition, a plurality of protrusions 98 can be disposed on the edge of the holes 78 to space the egg from the edge so that an air space is formed between the egg and the edge for better cooking.

The steamer cup 74, the meat tray 90, and/or the lid 86 can each have a handle 102*a-c* that aligns and engages with an adjacent handle to maintain alignment. Thus, the handles 102*a-c* of the steamer cup, meat tray, and/or lid can be grasped and lifted together. The handles 102*a-c* can mate, with a protrusion of one extending into an aperture or indentation of another, to maintain alignment. The handles can be configured to engage an adjacent handle even when on component is removed, such as the handle 102*c* of the lid 86 engaging the handle 102*a* of the steamer cup 74, with the meat tray 90, and thus the handle 102*b*, removed. The handle 70 of the egg cup 66 can nest within, or be sandwiched between, the other handles 102*a-c* to insulate the handle 70 from the user to resist burns. Thus, the steamer cup, the meat tray, the lid and the egg cup can be lifted together.

The housing 22 can include a steamer cup indentation 106 extending into the housing, both horizontally from a side and vertically from a top, to receive the steamer cup 74. The indentation 106 can help position the steamer cup 74 over the heating pan 38 and the housing. The indentation 106 can include a substantially vertically oriented wall around at least a portion of the steamer cup indentation. The cup indentation 106 allows the housing 22 or device 10 to be smaller, and can help position steamer cup 74.

In addition, the steamer compartment 18 is recessed into the housing 22 below a top of the housing so that a top of the lid 86 is disposed at an elevation substantially at an elevation of the top of the housing 22. Thus, the device 10 efficiently utilizes space.

In use, the combination bread toaster and steamer device 10 can be utilized to make a breakfast sandwich. Water can be placed in the heater pan 38. The steamer cup 74 can be placed over the heater pan 34. An egg can be opened and at least the egg white placed in the egg cup 66. The egg cup 66 can be placed in the steamer cup 74. A piece of meat can be placed on the meat tray 90, and the meat tray can be placed on the steamer cup 74. The lid 86 can be placed on the meat tray 90 and over the steamer cup 74. One or two pieces of bread or English muffin can be placed in the bread slots 26 of the toaster 14. The single input 54 can be pushed and the slider arm or lever 34 depressed.

As described above, the controller activates the steamer heating element 46 first to begin steaming the water, and thus cooking the egg. After a predetermined delay (such as approximately 45 seconds), the controller activates the bread heating elements 42 to toast the bread. After another predetermined time (such as four minutes), the controller deactivates the heating elements 46 and 42. The toaster 14 can have an independent automatic mechanism that can allow the lifting mechanism to lift the bread, and deactivate the bread heating element 42 independently in accordance with a preselected toasting level associated with a toasting level input 110. The toasting level input 110 can range from light to dark, and can be associated with time of the bread heating elements. The automatic mechanism for releasing the toast can be an electric timer or mechanical sensor, as is known in the art.

After the heating elements are deactivated, the bread, now toast, can be removed, and the egg and the meat placed on or between the bread to form a breakfast sandwich.

Alternatively, a whole egg can be placed into the steamer cup 74 without the egg cup 66 or the meat tray 90.

Alternatively, the bread heating element and the steamer heating element can be activated at the same time, but the bread heating element can deactivate prior to the steamer heating element. In such a case, the lift mechanism for the bread can be delayed to maintain the bread in the slot, and thus maintain the temperature of the bread, until the steamer heating element terminates.

Although the function and operation of the combination bread toaster and steamer device 10, or breakfast sandwich maker, has been described above as being configured to delay toasting so that both toasting and steaming function are completed substantially at the same time, it will be appreciated that the device can be configured so that the toasting function completes before the steaming function. Thus, for example, a user can butter the toasted bread while the steaming function completes. For example, the device can be configured so that selecting the single function of both toasting and steaming and depressing the toaster lever starts both toasting and steaming at the same time.

Although the steamer 18 has been described as including various different parts, it will be appreciated that some of the different parts can be combined. For example, the egg cup 66 may be integrally formed with the steamer cup 74.

Although the steamer 18 has been described and shown on a side, or longitudinal end, of the device, it will be appreciated that the steamer 18 can be positioned on a front or back of the device, or on a lateral side of the device.

Although the steamer 18 or components thereof have been described with respect to certain specific functions, it will be appreciated that other functions or uses may be utilized. For example, the meat tray may be used for a food other than meat. As another example, the egg or food may be placed directly into the steamer cup.

Although the controller has been described above with predetermined times set for eggs, it will be appreciated that the predetermined times can be different for different foods, or that another input or selector can be provided to vary or select the cooking time.

Although the device has been described with respect to a single input for selecting and controlling both the toasting and steaming functions, it will be appreciated that the toaster or bread heating element can be provided with a separate input and the steaming or steamer heating element can be provided with a separate input.

Although the combination bread toaster and steamer device 10 described above is configured as a breakfast sandwich maker, it will be appreciated that the device can be configured for use with other types of food. For example, the device 10*b* can be configured to make hot dogs, as shown in FIGS. 13*a-d*. Thus, the bread slots 26*b* of the toaster 14*b* can be sized deeper or longer to receive and toast hotdog buns, and the steamer compartment 18*b* can be taller or elevated to receive one or more hot dogs or sausages in a vertical orientation. Thus, the steamer cup 74*b* can be taller, and the lid 86*b* can be disposed at a higher elevation to accommodate the hot dogs. In addition, the steamer cup 74*b* and/or the lid 86*b* can be configured to support hot dogs. The steamer cup 74 can still be received in a cup indentation 106*b* in the housing 22*b*. A turnable knob selector 54*b* can be provided to turn between "toast," "toast and hot dog," "hot dog," and "cancel." Both the bread heating element and steamer heating element can be activated by turning the knob selector 54*b* and depressing the slider or lever arm 34.

A method for utilizing the device 10, and/or for method for toasting bread and simultaneously cooking or warming another food with a single device, includes (without regard to order): inserting at least one piece of bread into a vertically oriented bread slot 26 of a combination bread toaster and steamer device 10; placing water into a heater pan 38 of a steamer compartment 18 on the combination bread toaster and steamer device; placing another food into the steamer compartment 18; and activating at least one heating element 42 and 46 associated with the bread slot 26 and the steamer compartment 18. In addition, a controller can be activated that initially activates a steamer heating element 46 associated with the steamer compartment 18, and that automatically and subsequently activates a bread heating element 42 associated with the bread slots 26. Activating the controller can include activating a single input 54.

As indicated above, the method can be utilized for making a breakfast sandwich, including: placing at least an egg white from an opened egg shell into an egg cup 66 in the steamer compartment 18; and activating a controller to activate the steamer heating element 46 for approximately four minutes, and to subsequently activate the bread heating element 42 at least approximately 45 seconds after activation of the steamer heating element.

In addition, a toast cooking control, such as a light to dark slide controller, can be engaged to select the desired degree of toasting for the bread. The bread heating element and the steamer heating element can be activated at the same time, but the bread heating element can deactivate prior to the steamer heating element. In such a case, the lift mechanism for the bread can be delayed to maintain the bread in the slot, and thus maintain the temperature of the bread, until the steamer heating element terminates.

The method can include placing a meat on a meat tray 90 disposable over the steamer compartment 18, the meat tray having a plurality of apertures 94 therein.

In addition, the handles 102*a-c* of the steamer cup 74, the meat tray 90 and a lid 86 can be aligned and engaged with adjacent handles to maintain alignment.

Furthermore, the method can include: deciding whether to cook an opened egg or an unopened egg, and then either: 1) placing at least an egg white of an opened egg in an egg cup 66 in the steamer cup 74; or placing an unopened egg into an aperture 78 of the steamer cup 74.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A combination bread toaster and steamer device, comprising:
   a) a housing;
   b) at least one vertically oriented bread slot extending into the housing from a top of the housing;
   c) a lift mechanism for lowering bread into the bread slot and raising the bread out of the bread slot, and including an arm coupled to the lift mechanism configured to be contacted by a user to manually lower the lift mechanism;
   d) a steamer compartment, disposed on the housing, including a heater pan configured to receive water;
   e) a bread heating element disposed adjacent the bread slot;
   f) a steamer heating element disposed adjacent the steamer compartment;
   g) a controller operatively coupled to the bread heating element and the steamer heating element to initially activate the steamer heating element, and automatically and subsequently activate the bread heating element;
   h) the lift mechanism being operatively coupled to the controller such that depressing the arm and lowering the lift mechanism activates the steamer heating element.

2. A device in accordance with claim 1, wherein the bread heating element and the steamer heating element share a common controller for activating both the bread heating element and the steamer heating element.

3. A device in accordance with claim 1, further comprising:
   means for delaying operation of the bread heating element with respect to operation of the steamer heating element.

4. A device in accordance with claim 1, wherein the steamer compartment includes an egg cup configured to receive at least an egg white from an opened egg shell; and wherein the controller is configured to activate the steamer heating element for approximately four minutes, and is configured to activate the bread heating element at least approximately 45 seconds after activation of the steamer heating element.

5. A device in accordance with claim 1, further comprising: a selection control operatively coupled to the bread heating element and the steamer heating element, and selectable between at least three operating conditions, including:
   operation of only the bread heating element;
   operation of only the steamer heating element; and
   operation of both the bread heating element and the steamer heating element.

6. A device in accordance with claim 1, further comprising:
   a meat tray, disposable over the steamer compartment, having a plurality of apertures therein, the meat tray configured to receive a meat to be warmed by the steamer heating element.

7. A device in accordance with claim 1, wherein the steamer compartment further comprises:
   a steamer cup, removably disposable over the heater pan, having a plurality of openings therein; and
wherein the housing further comprises:
   a steamer cup indentation extending into the housing both horizontally from a side of the housing and vertically from a top of the housing to receive the steamer cup, the steamer cup indentation including a substantially vertically oriented wall around at least a portion of the steamer cup indentation.

8. A device in accordance with claim 1, wherein the steamer compartment further comprises:
   a steamer cup, removably disposable over the heater pan, having a plurality of openings therein;
   a food cup, disposable in the steamer cup; and
   a lid, disposable over the steamer cup and the food cup; and
   the steamer cup further including a plurality of apertures each sized to support and maintain at least one whole egg therein, and a plurality of protrusions to align the food cup therein.

9. A device in accordance with claim 1, wherein the steamer compartment further comprises:
   a steamer cup, removably disposable over the heater pan, having a plurality of openings therein; and
   the steamer cup further including a plurality of apertures each sized to support and maintain at least one whole egg therein.

10. A device in accordance with claim 1, wherein the steamer compartment further comprises:
    a steamer cup, removably disposable over the heater pan, having a plurality of openings therein; and
    a lid, disposable over the steamer cup; and
    the steamer cup and the lid each have a handle that aligns and engages with one another to maintain alignment of the handles.

11. A device in accordance with claim 1, wherein the steamer compartment is recessed into the housing below a top of the housing, and includes a lid disposable over the steamer compartment with a top disposed at an elevation substantially at an elevation of the top of the housing.

12. A device in accordance with claim 1, further comprising:
    a thermostat operatively coupled to the heater pan and the steamer heating element to sense temperature in the heater pan and inactivate the steamer heating element at a predetermined temperature.

13. A device in accordance with claim 1, further comprising:
    a steamer cup or a food cup, disposable over the heater pan; and
    a tray, disposable over the steamer cup or the food cup, having at least one hole therein to allow steam therethrough.

14. A device in accordance with claim 1, further comprising:
    a steamer cup, removably disposable over the heater pan, having a plurality of openings therein; and
    a steamer cup indentation extending into the housing both horizontally from a side of the housing and vertically from a top of the housing to receive the steamer cup, the steamer cup indentation including a substantially vertically oriented wall around at least a 15. A combination bread toaster and steamer device, comprising:
    a) a housing;
    b) at least one bread slot extending into the housing;
    c) a steamer compartment, disposed on the housing, including a heater pan configured to receive water;
    d) a bread heating element disposed adjacent the at least one bread slot;
    e) a steamer heating element disposed adjacent the steamer compartment;
    f) a controller operatively coupled to the bread heating element and the steamer heating element to activate the steamer heating element and the bread heating element; and g) a lift mechanism for lowering bread into the bread slot and raising the bread out of the bread slot, and operatively coupled to the controller such that lowering the lift mechanism activates the steamer heating element.

16. A device in accordance with claim 15, wherein the bread heating element and the steamer heating element share a common controller for activating both the bread heating element and the steamer heating element.

17. A device in accordance with claim 15, wherein the steamer compartment includes an egg cup configured to receive at least an egg white from an opened egg shell; and further comprising a controller configured to activate the steamer heating element for approximately four minutes, and configured to activate the bread heating element at least approximately 45 seconds after activation of the steamer heating element.

18. A device in accordance with claim 15, further comprising:
   a meat tray, disposable over the steamer compartment, having a plurality of apertures therein, the meat tray configured to receive a meat to be warmed by the steamer heating element.

19. A device in accordance with claim 15, further comprising:
   a thermostat operatively coupled to the heater pan and the steamer heating element to sense temperature in the heater pan and inactivate the steamer heating element at a predetermined temperature.

20. A device in accordance with claim 15, further comprising:
   a steamer cup or a food cup, disposable over the heater pan; and
   a tray, disposable over the steamer cup or the food cup, having at least one hole therein to allow steam therethrough.

21. A device in accordance with claim 15, further comprising:
   a steamer cup, removably disposable over the heater pan, having a plurality of openings therein; and
   a steamer cup indentation extending into the housing both horizontally from a side of the housing and vertically from a top of the housing to receive the steamer cup, the steamer cup indentation including a substantially vertically oriented wall around at least a portion of the steamer cup indentation.

22. A combination bread toaster and steamer device, comprising:
   a) a housing;
   b) at least one bread slot extending into the housing;
   c) a steamer compartment, disposed on the housing, including a heater pan configured to receive water;
   d) at least one heating element associated with the bread slot and the steamer compartment;
   e) a steamer cup or a food cup, disposable over the heater pan; and
   f) a tray, disposable over the steamer cup or the food cup, having at least one hole therein to allow steam therethrough.

23. A device in accordance with claim 22, further comprising:
   the tray and the steamer cup or the food cup each having a handle that aligns and engages with one another to maintain alignment of the handles.

24. A device in accordance with claim 22, wherein the tray includes a perimeter flange sloped inwardly and downwardly.

25. A device in accordance with claim 22, wherein the at least one heating element includes: a bread heating element disposed adjacent the bread slot and a steamer heating element disposed adjacent the steamer compartment; and further comprising: a single input and a controller operatively coupled to the bread heating element and the steamer heating element to initially activate the steamer heating element, and automatically and subsequently activate the bread heating element.

26. A device in accordance with claim 22, further comprising:
   a lift mechanism for lowering bread into the bread slot and raising the bread out of the bread slot, and operatively coupled to the controller such that lowering the lift mechanism activates the at least one heating element.

27. A combination bread toaster and steamer device, comprising:
   a) a housing;
   b) at least one bread slot extending into the housing;
   d) a steamer compartment, disposed on the housing, including a heater pan configured to receive water;
   e) at least one heating element associated with the bread slot and the steamer compartment;
   f) a steamer cup, removably disposable over the heater pan, having a plurality of openings therein; and
   g) a steamer cup indentation extending into the housing both horizontally from a side of the housing and vertically from a top of the housing to receive the steamer cup, the steamer cup indentation including a substantially vertically oriented wall around at least a portion of the steamer cup indentation.

28. A device in accordance with claim 27, wherein the at least one heating element includes: a bread heating element disposed adjacent the bread slot and a steamer heating element disposed adjacent the steamer compartment; and further comprising: a single input and a controller operatively coupled to the bread heating element and the steamer heating element to initially activate the steamer heating element, and automatically and subsequently activate the bread heating element.

29. A device in accordance with claim 27, further comprising:
   a lift mechanism for lowering bread into the bread slot raising the bread out of the bread slot, and operatively coupled to the controller such that lowering the lift mechanism activates the at least one heating element.

30. A combination bread toaster and steamer device, comprising:
   a) a housing;
   b) at least one bread slot extending into the housing;
   d) a steamer compartment, disposed on the housing, including a heater pan configured to receive water;
   e) at least one heating element associated with the bread slot and the steamer compartment;
   f) a controller operatively coupled to the bread heating element and the steamer heating element to activate the steamer heating element and the bread heating element;
   g) a lift mechanism for lowering bread into the bread slot and raising the bread out of the bread slot, and operatively coupled to the controller such that lowering the lift mechanism activates the steamer heating element;
   h) a steamer cup, removably disposable over the heater pan, having a plurality of openings therein; and i) a steamer cup indentation extending into the housing both horizontally from a side of the housing and vertically from a top of the housing to receive the steamer cup, the steamer cup indentation including a substantially vertically oriented wall around at least a portion of the steamer cup indentation.

31. A device in accordance with claim 30, further comprising:
a tray, disposable over the steamer cup, having at least one hole therein to allow steam therethrough.

* * * * *